United States Patent
Nakao et al.

(10) Patent No.: US 11,643,095 B2
(45) Date of Patent: May 9, 2023

(54) ELECTRONIC CONTROL DEVICE, CONTROL SYSTEM, AND RESET DETERMINATION METHOD

(71) Applicant: Hitachi Astemo, Ltd., Ibaraki (JP)

(72) Inventors: Shogo Nakao, Tokyo (JP); Nobuki Sato, Hitachinaka (JP); Mitsuo Sasaki, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 366 days.

(21) Appl. No.: 16/472,533

(22) PCT Filed: Dec. 4, 2017

(86) PCT No.: PCT/JP2017/043490
§ 371 (c)(1),
(2) Date: Jun. 21, 2019

(87) PCT Pub. No.: WO2018/116801
PCT Pub. Date: Jun. 28, 2018

(65) Prior Publication Data
US 2021/0129855 A1 May 6, 2021

(30) Foreign Application Priority Data

Dec. 21, 2016 (JP) .............................. JP2016-247783

(51) Int. Cl.
*B60W 50/02* (2012.01)
*G05D 1/00* (2006.01)
*B60W 50/00* (2006.01)

(52) U.S. Cl.
CPC .... *B60W 50/0225* (2013.01); *B60W 50/0205* (2013.01); *G05D 1/0055* (2013.01);
(Continued)

(58) Field of Classification Search
CPC ......... B60W 50/0225; B60W 50/0205; B60W 2050/0083; B60W 2050/0215;
(Continued)

(56) References Cited

U.S. PATENT DOCUMENTS 10,204,461 B2 * 2/2019 Chen ................... B60W 50/029
2004/0007416 A1 * 1/2004 Furumi .................. B62D 5/046
180/443
(Continued)

FOREIGN PATENT DOCUMENTS

| JP | 2004-104253 A | 4/2004 |
| JP | 2016-057888 A | 4/2016 |
| JP | 2016-092547 A | 5/2016 |

OTHER PUBLICATIONS

International Search Report dated Feb. 27, 2018 for the PCT International Application No. PCT/JP2017/043490.

*Primary Examiner* — Jeff A Burke
*Assistant Examiner* — Sihar A Karwan
(74) *Attorney, Agent, or Firm* — Volpe Koenig

(57) ABSTRACT

An electronic control device includes a control command generation unit that generates and outputs a control command for controlling a first control object; a communication unit that performs communication with another electronic control device that controls a second control object; a communication abnormality determination unit that determines whether communication with the another electronic control device by the communication unit is abnormal; and a reset determination unit that determines whether the another electronic control device is reset based on a change in a sensor signal related to a state of the second control object when the communication abnormality determination unit determines that the communication with the another electronic control device is abnormal.

10 Claims, 14 Drawing Sheets

(52) U.S. Cl.
CPC ............... *B60W 2050/0083* (2013.01); *B60W 2050/0215* (2013.01)

(58) Field of Classification Search
CPC .... G05D 1/0055; G05B 19/0428; B62D 5/04; B62D 6/00
See application file for complete search history.

(56) References Cited

U.S. PATENT DOCUMENTS

| | | | |
|---|---|---|---|
| 2009/0276117 A1* | 11/2009 | Raichle ................ | B60W 50/02 701/29.3 |
| 2015/0268133 A1* | 9/2015 | Ranjan ................ | G06F 11/3013 702/183 |

* cited by examiner

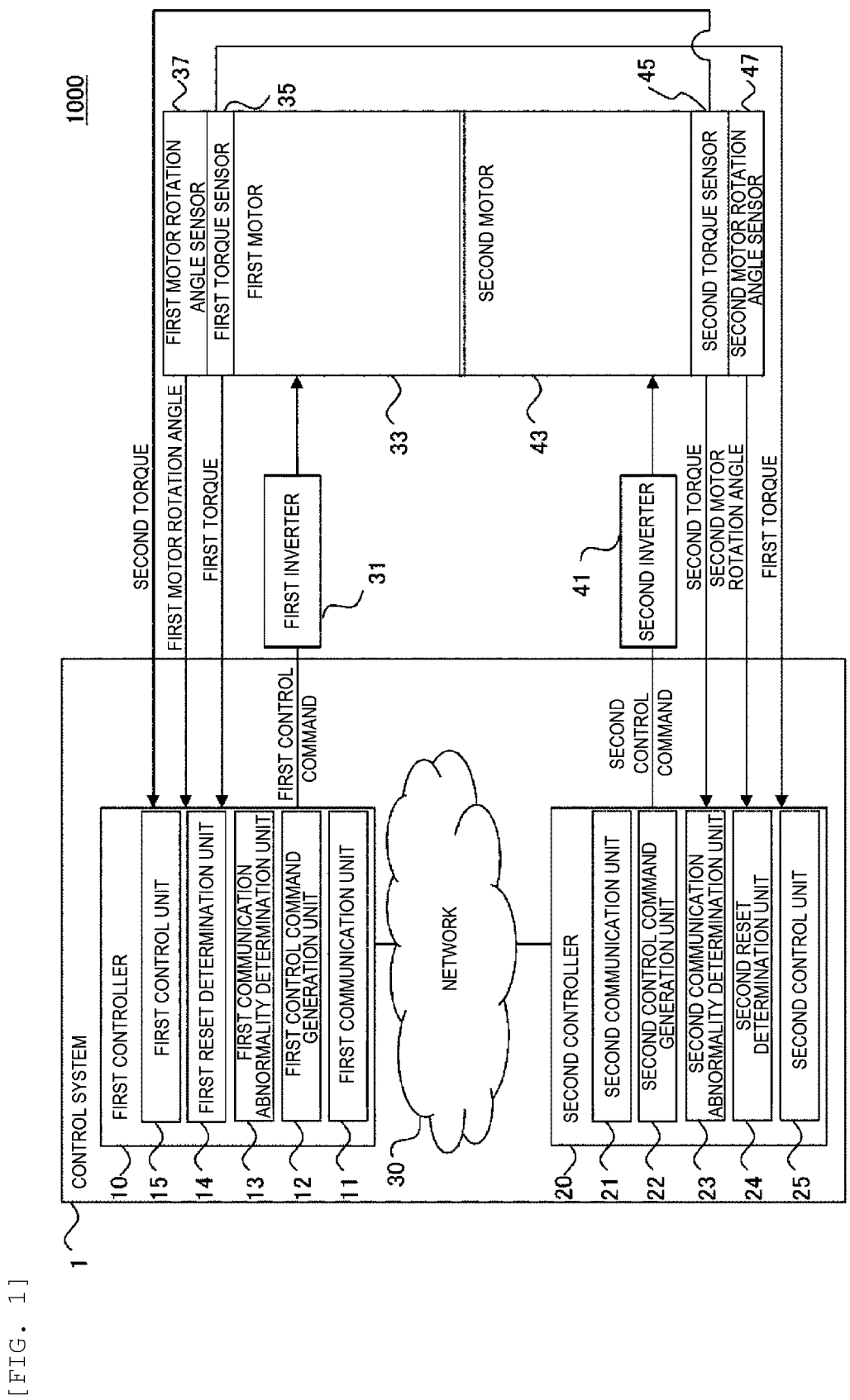
[FIG. 1]

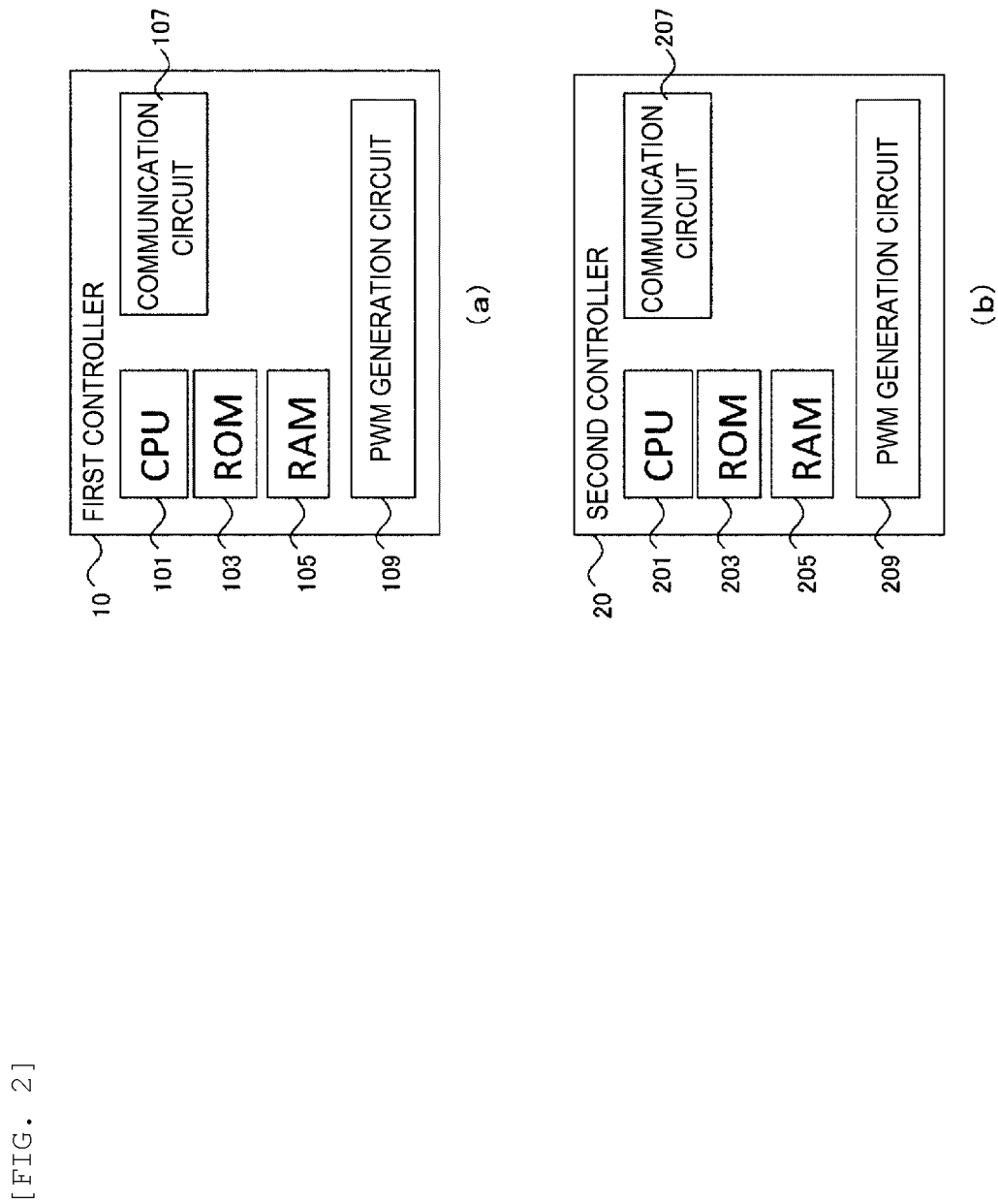

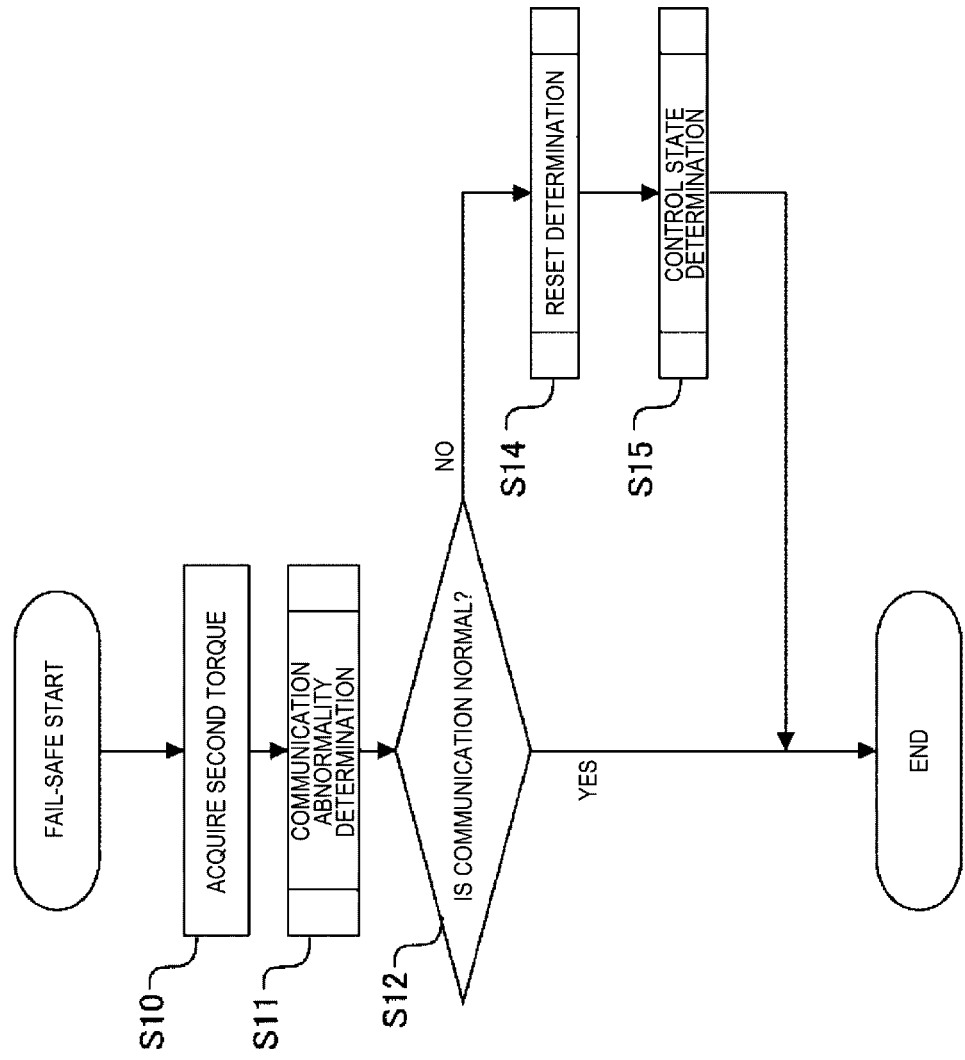
[FIG. 3]

[FIG. 4]
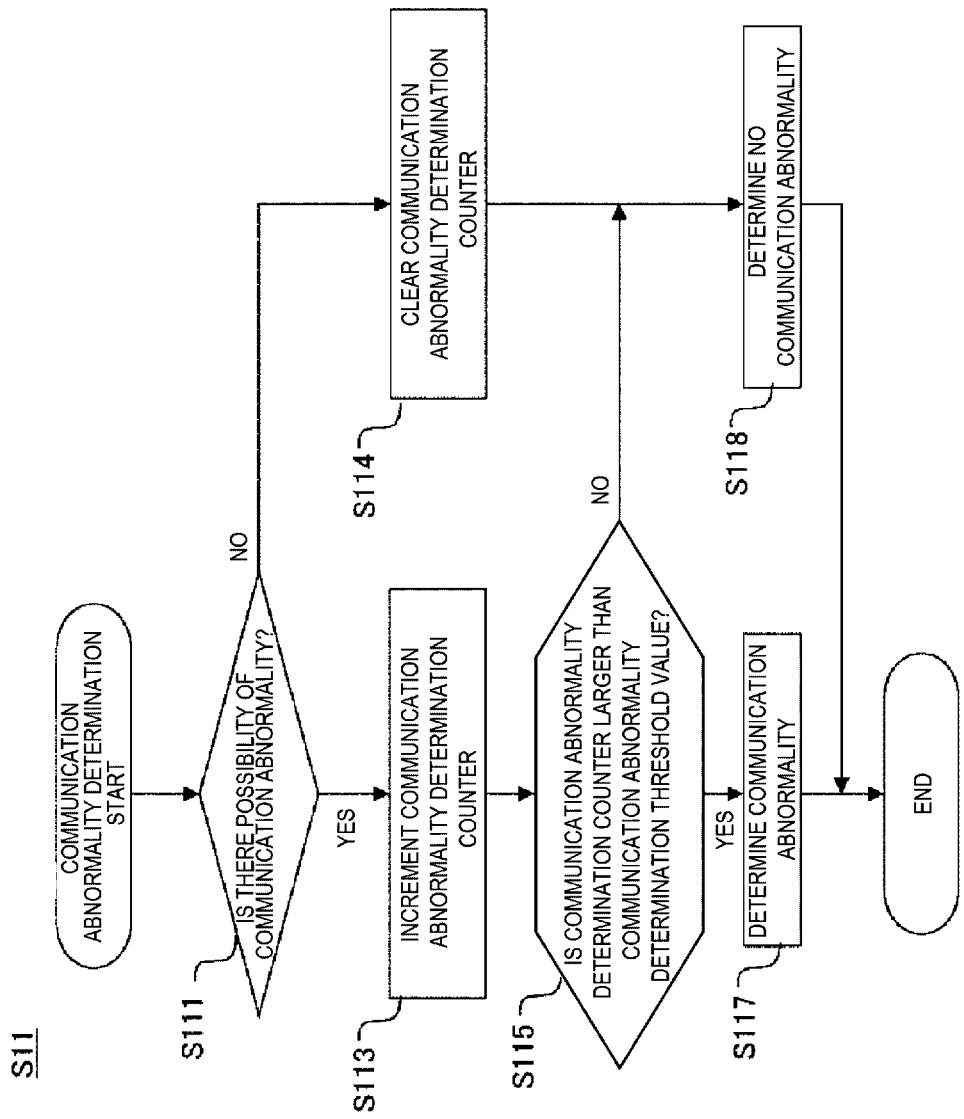

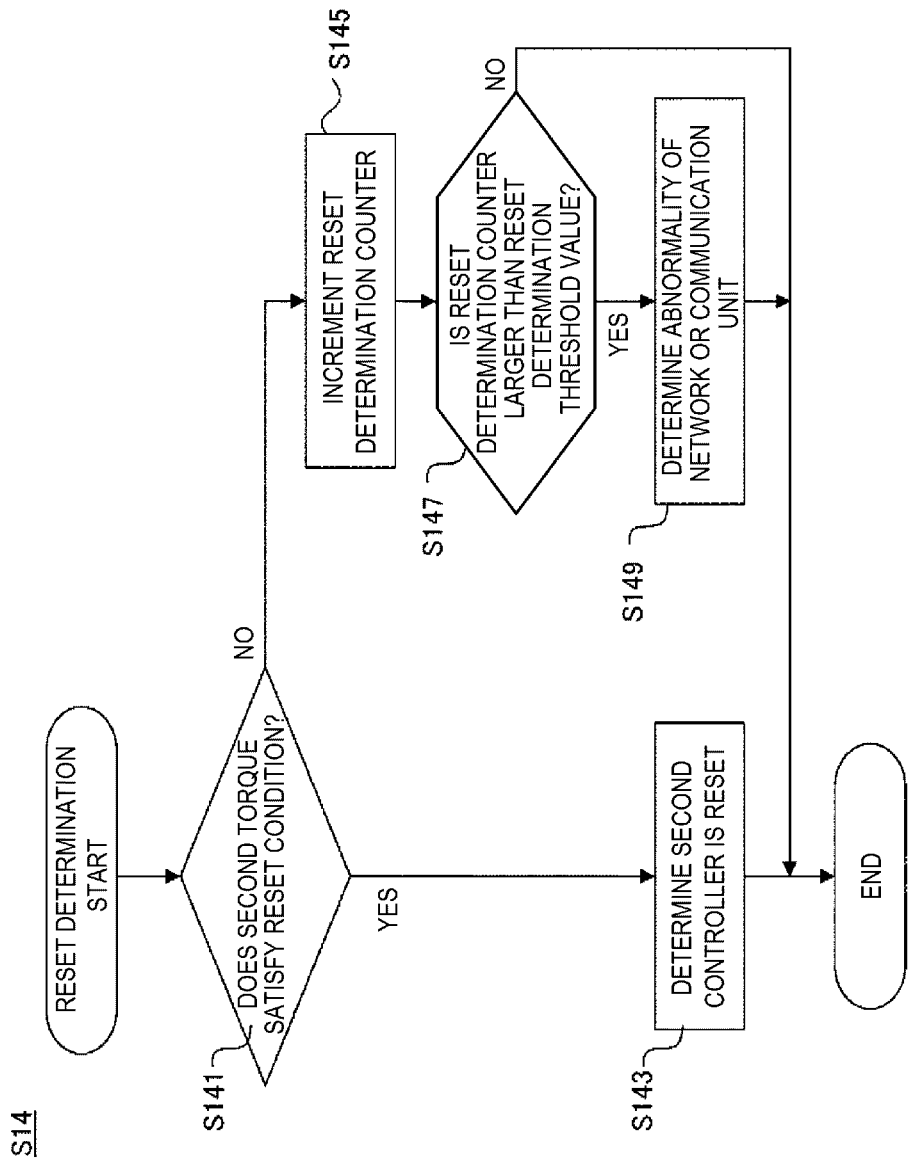
[FIG. 5]

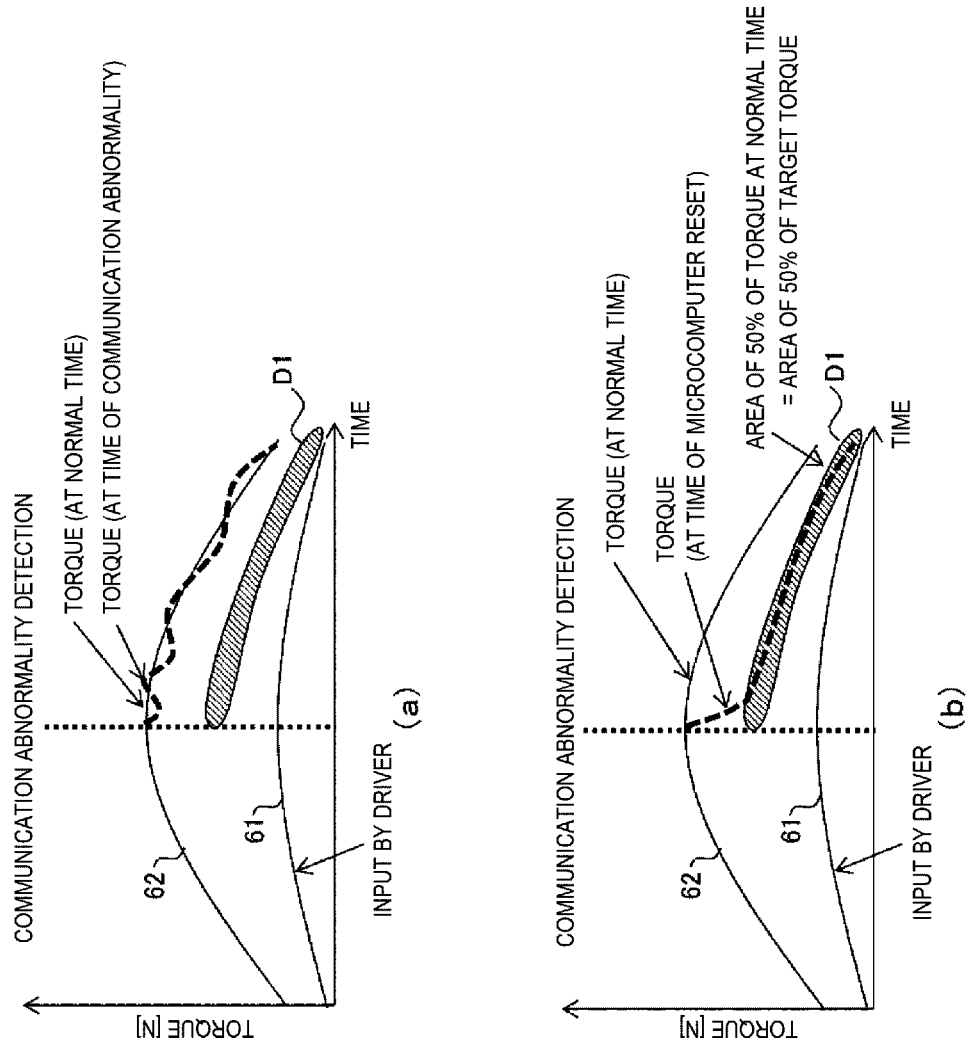
[FIG. 6]

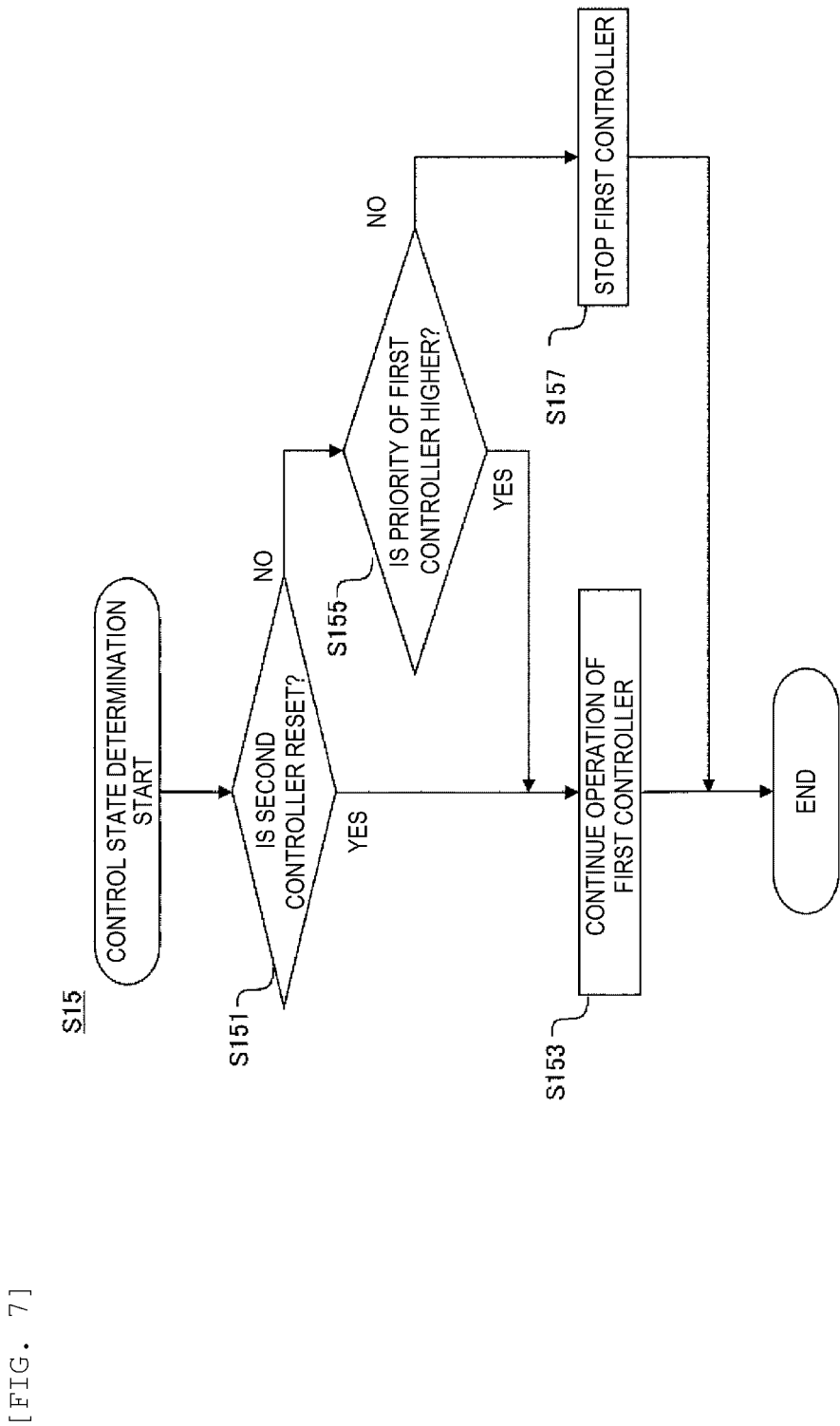
[FIG. 7]

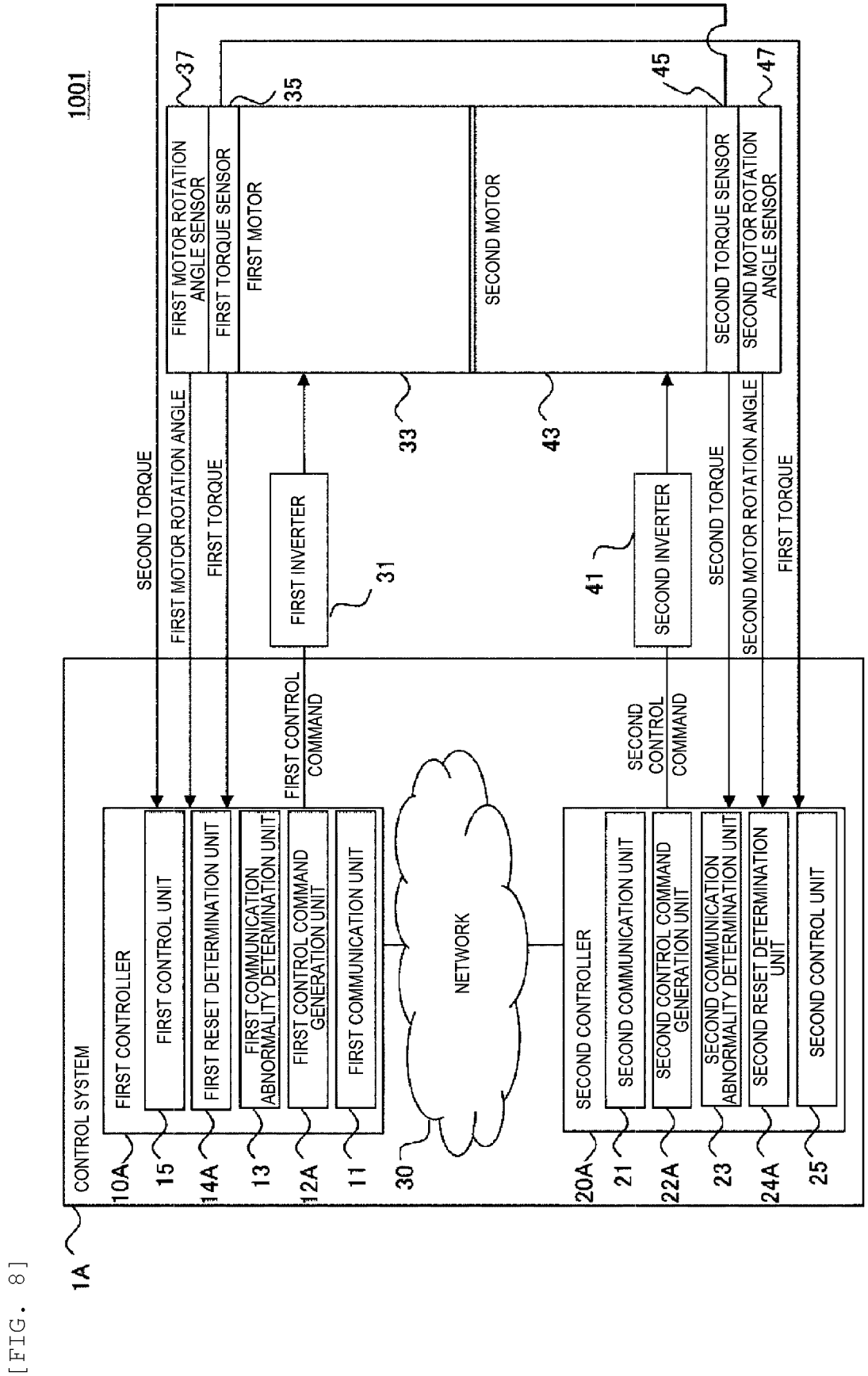
[FIG. 8]

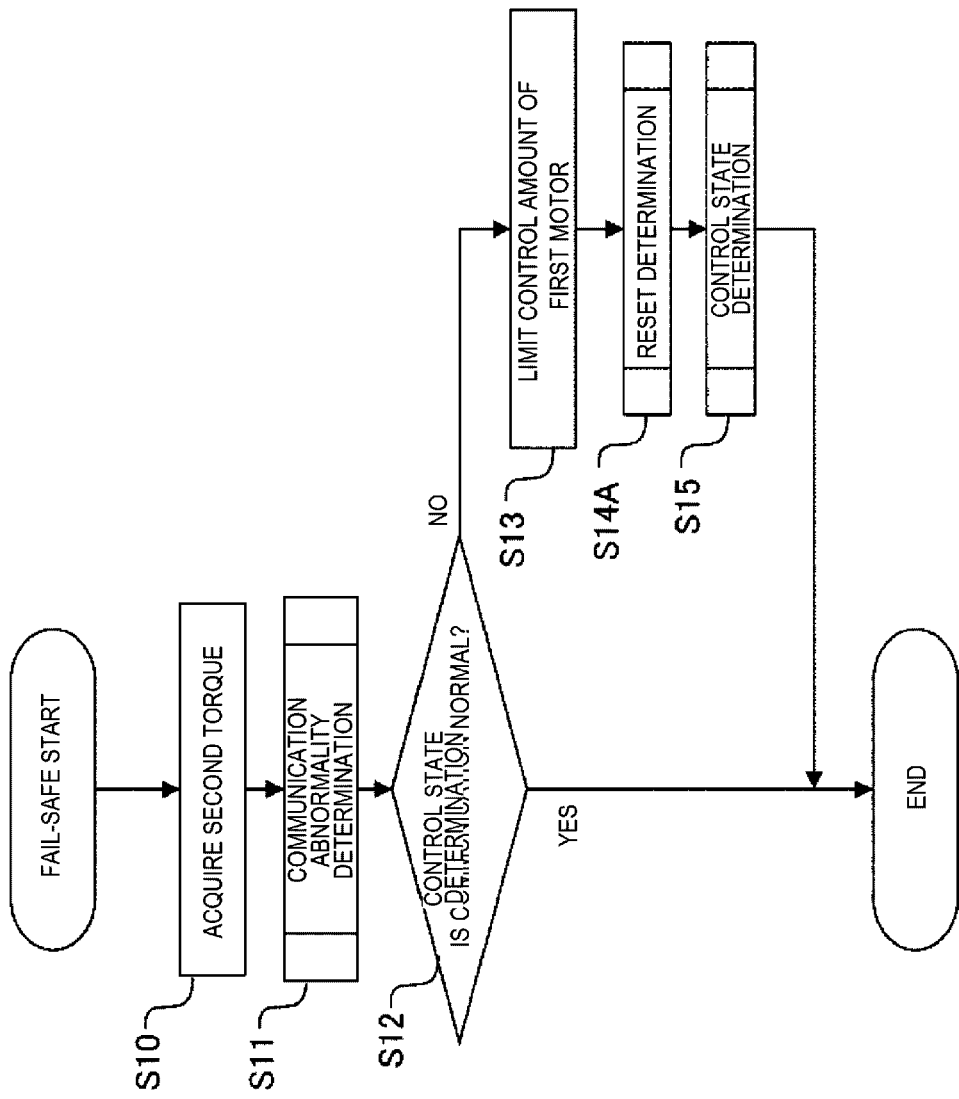
[FIG. 9]

[FIG. 10]
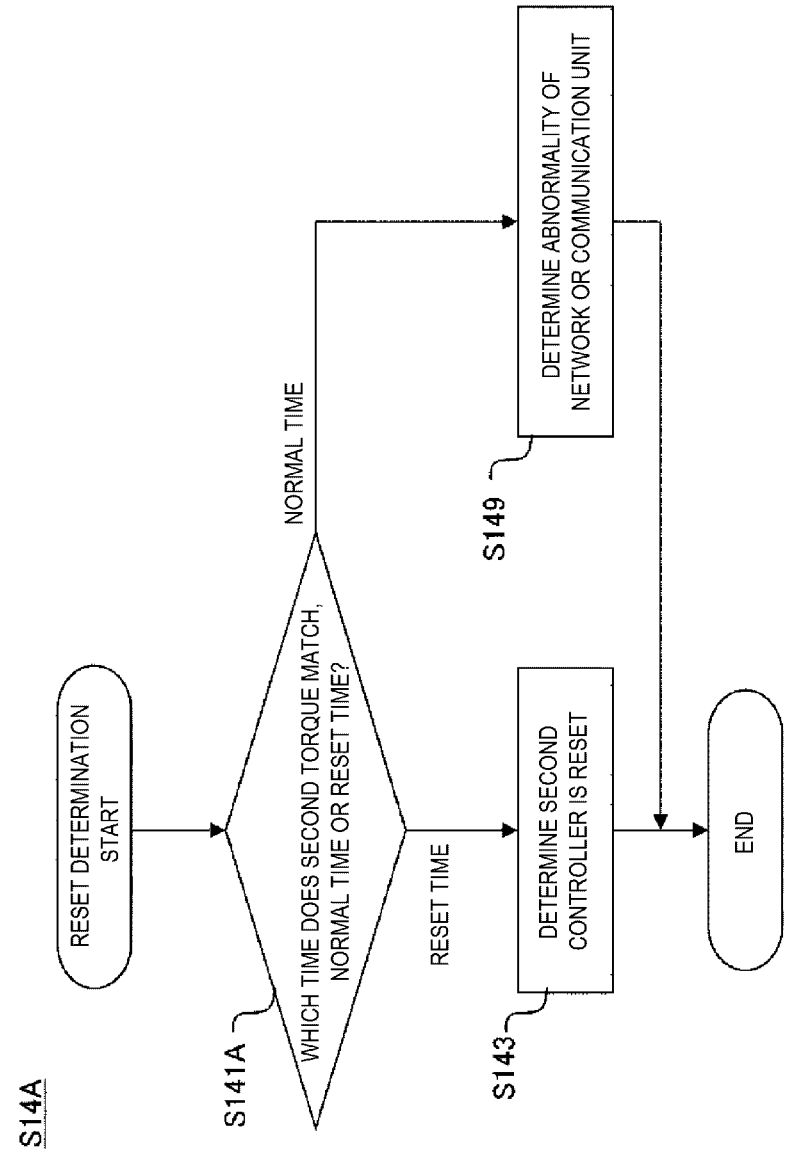

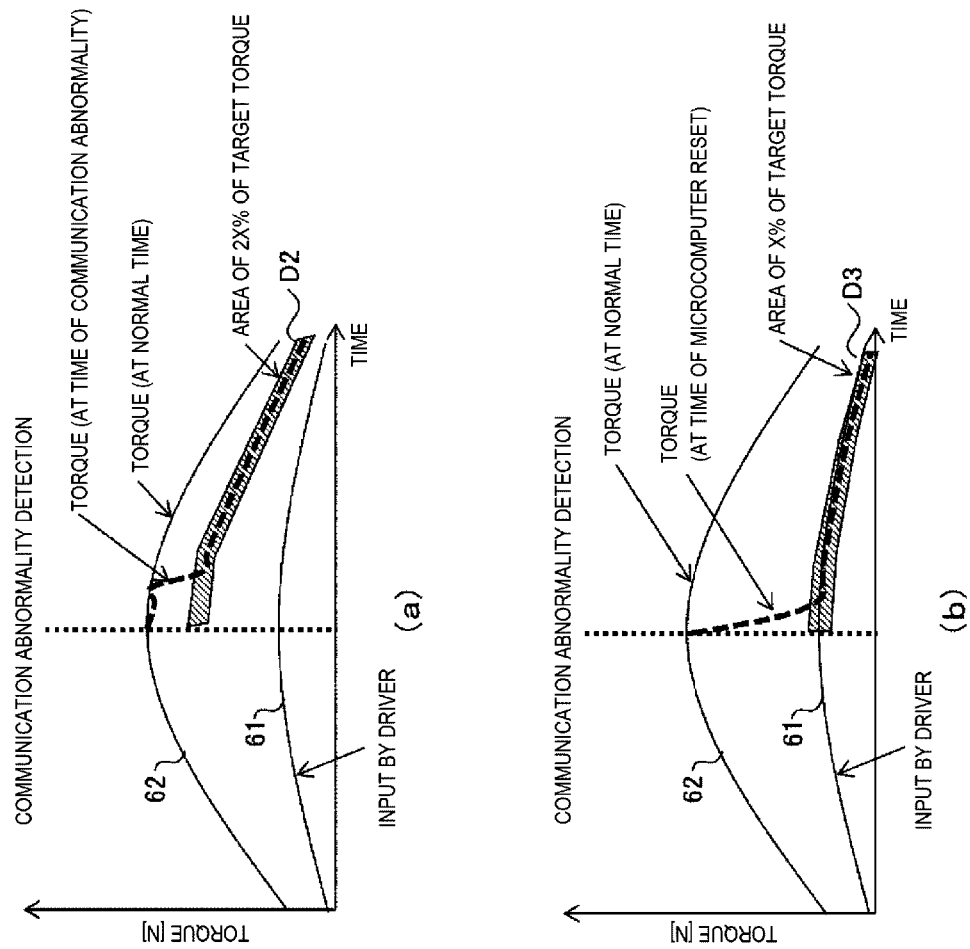
[FIG. 11]

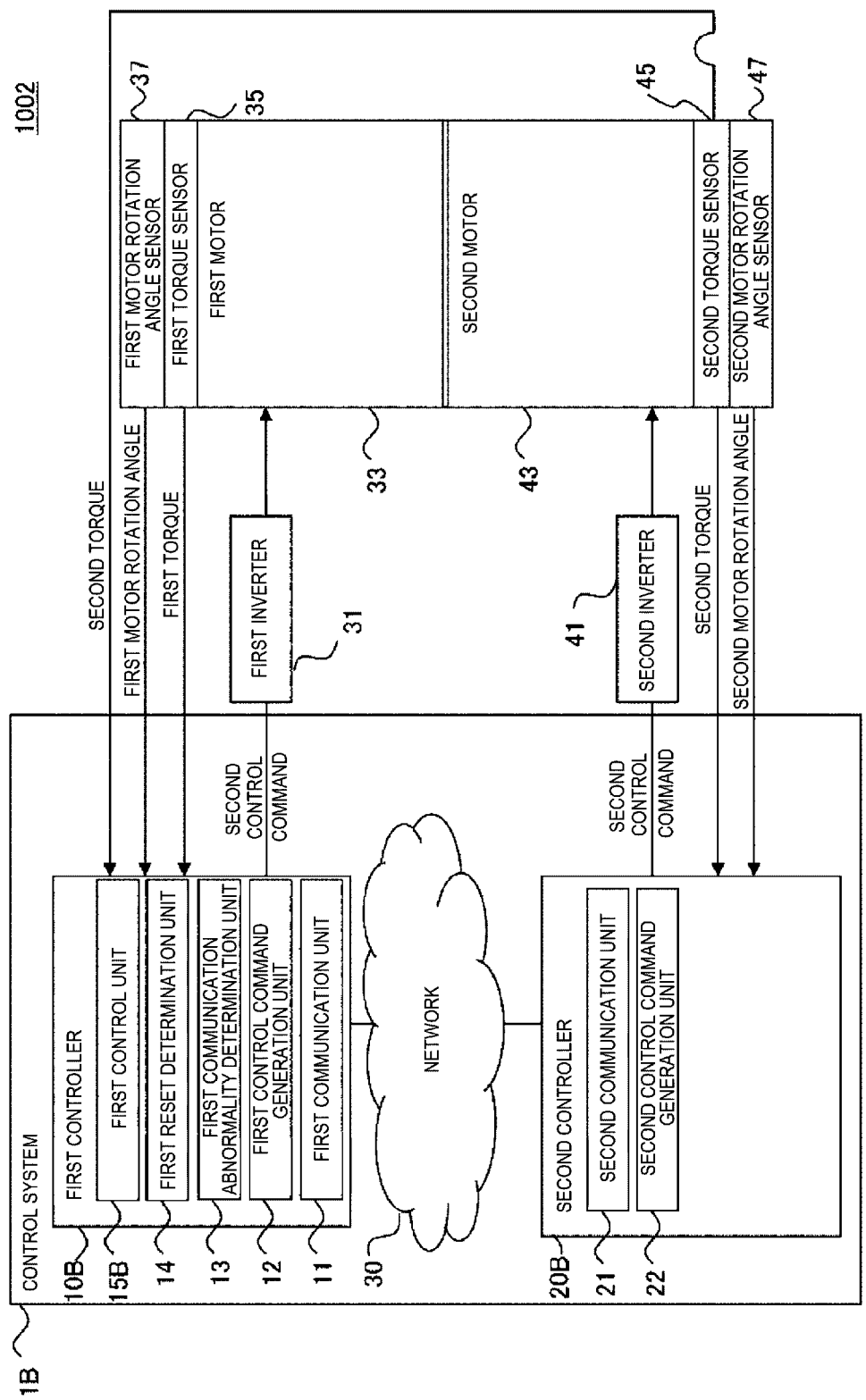
[FIG. 12]

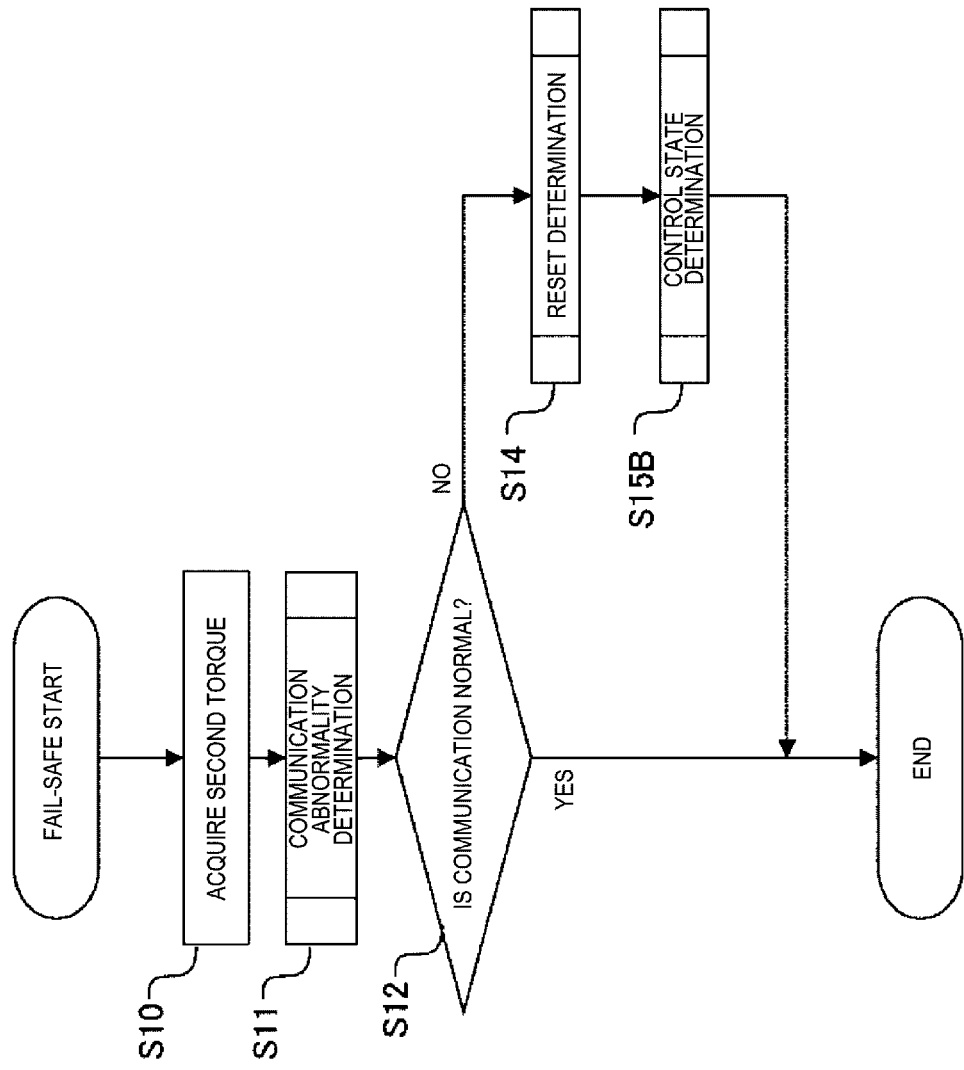
[FIG. 13]

[FIG. 14]
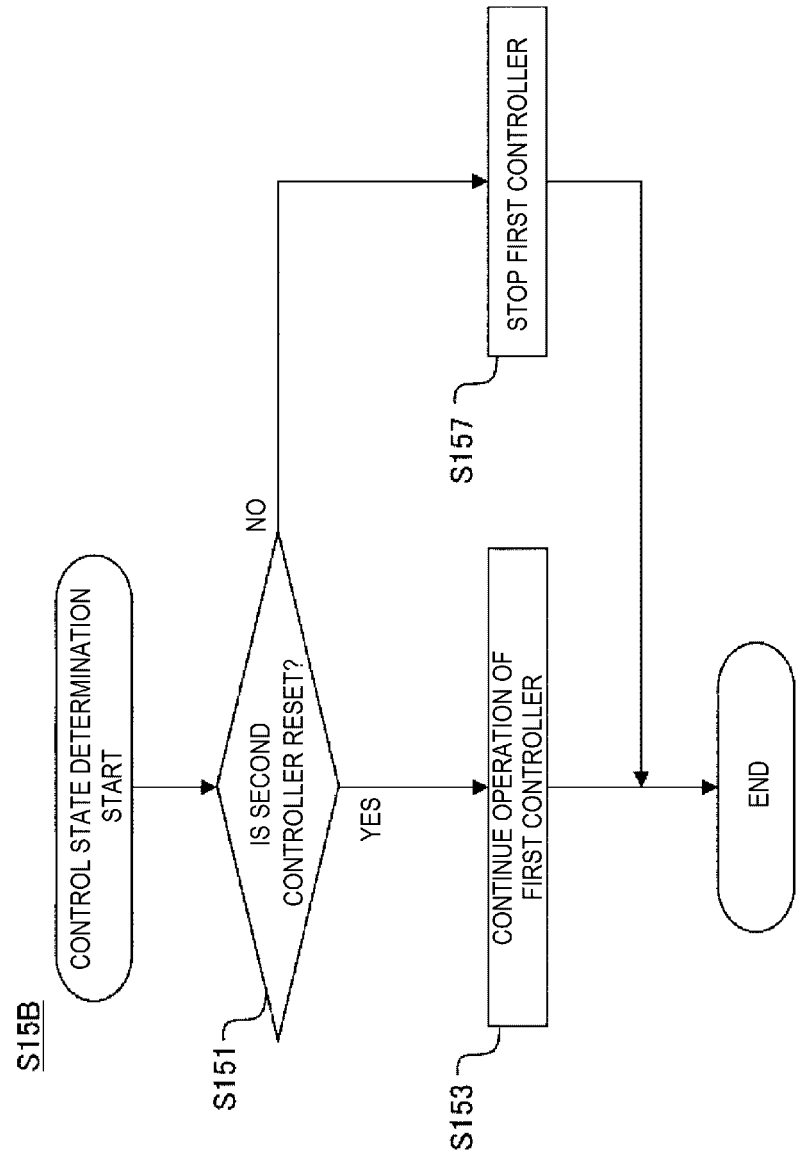

ELECTRONIC CONTROL DEVICE, CONTROL SYSTEM, AND RESET DETERMINATION METHOD

TECHNICAL FIELD

The present invention relates to an electronic control device, a control system using the electronic control device, and a reset determination method.

BACKGROUND ART

In an automotive field, an electronic control device (ECU) that performs control on various actuators mounted on a vehicle is used. The electronic control device is required to have a predetermined safety design to reduce the risk of a vehicle accident when a failure occurs. For example, in a control system that controls steering and braking in an autonomous driving vehicle, a redundant configuration using a plurality of electronic control devices that perform communication with each other is widely adopted in order to continue the control to ensure the safety of the driver even when the failure occurs.

In such a control system having the redundant configuration, when a communication abnormality occurs between the electronic control devices, in order to properly determine a subsequent control mode, it is necessary to immediately determine whether the cause of the communication abnormality is a failure of the communication function or one of the electronic control devices is in a reset state. In this regard, PTL 1 discloses a technique for distinguishing and detecting an abnormality of a microcomputer and an abnormality of a communication line by determining whether a communication interruption state is eliminated within a predetermined time when the communication interruption state occurs between the microcomputers respectively mounted on two electronic control devices.

PRIOR ART LITERATURE

Patent Literature

PTL 1: JP-A-2016-57888

SUMMARY OF INVENTION

Technical Problem

In the technique disclosed in PTL 1, it is not possible to distinguish between the abnormality of the microcomputer and the abnormality of the communication line until the time required for the microcomputer to rise from a reset state and resume a communication has elapsed. Therefore, it is not possible to immediately determine the cause of the communication abnormality.

Solution to Problem

An electronic control device according to a first aspect of the invention includes: a control command generation unit that generates and outputs a control command for controlling a first control object; a communication unit that performs communication with another electronic control device that controls a second control object; a communication abnormality determination unit that determines whether communication with the another electronic control device by the communication unit is abnormal; and a reset determination unit that determines whether the another electronic control device is reset based on a change in a sensor signal related to a state of the second control object when the communication abnormality determination unit determines that the communication with the another electronic control device is abnormal.

A control system according to a second aspect of the invention includes the electronic control device and another electronic control device, wherein the another electronic control device includes a second reset determination unit that determines whether the electronic control device is reset when communication with the electronic control device is abnormal, the reset determination unit determines that the another electronic control device is not reset, and a control of the first control object by the electronic control device or a control of the second control object by the another electronic control device is stopped based on priorities preset with respect to the electronic control device and the another electronic control device when the second reset determination unit determines that the electronic control device has not been reset.

A reset determination method according to a third aspect of the invention, in which a control system includes a first electronic control device and a second electronic control device that perform communication with each other, the reset determination method includes: determining, by the first electronic control device, whether the communication with the second electronic control device is abnormal; and determining, by the first electronic control device, whether the second electronic control device is reset based on a change of a sensor signal related to a state of a control object of the second electronic control device when it is determined that the communication with the second electronic control device is abnormal.

Advantageous Effect

According to the invention, when the communication abnormality occurs between the electronic control devices, the cause can be immediately determined.

BRIEF DESCRIPTION OF DRAWINGS

FIG. 1 is a block diagram showing a configuration of an electric power steering system on which an electronic control device according to a first embodiment of the invention is mounted.

FIG. 2 is a diagram showing a hardware configuration of the electronic control device according to the first embodiment of the invention.

FIG. 3 is a flowchart of a fail-safe processing according to the first embodiment of the invention.

FIG. 4 is a flowchart of communication abnormality determination according to the first embodiment of the invention.

FIG. 5 is a flowchart of reset determination according to the first embodiment of the invention.

FIG. 6 is a diagram illustrating a reset determination method according to the first embodiment of the invention.

FIG. 7 is a flowchart of control state determination according to the first embodiment of the invention.

FIG. 8 is a block diagram showing a configuration of an electric power steering system on which an electronic control device according to a second embodiment of the invention is mounted.

FIG. 9 is a flowchart of a fail-safe processing according to the second embodiment of the invention.

FIG. 10 is a flowchart of reset determination according to the second embodiment of the invention.

FIG. 11 is a diagram illustrating a reset determination method according to the second embodiment of the invention.

FIG. 12 is a block diagram showing a configuration of an electric power steering system on which an electronic control device according to a third embodiment of the invention is mounted.

FIG. 13 is a flowchart of a fail-safe processing according to the third embodiment of the invention.

FIG. 14 is a flowchart of control state determination according to the third embodiment of the invention.

DESCRIPTION OF EMBODIMENTS

First Embodiment

An electronic control device according to a first embodiment of the invention will be described below with reference to FIGS. 1 to 7. In the present embodiment, the description of the invention will be performed by taking an electronic control device mounted on an electric power steering system for assisting or controlling the steering of a vehicle as an example.

FIG. 1 is a block diagram showing a configuration of the electric power steering system on which the electronic control device according to the first embodiment of the invention is mounted. An electric power steering system 1000 shown in FIG. 1 is redundant in a first system and a second system that have the similar configuration and perform the similar operation. The first system includes a first controller 10, a first inverter 31, a first motor 33, a first torque sensor 35, and a first motor rotation angle sensor 37. The second system includes a second controller 20, a second inverter 41, a second motor 43, a second torque sensor 45, and a second motor rotation angle sensor 47. The first controller 10 and the second controller 20 are connected to each other via a network 30, and configure a control system 1. The network 30 is a transmission medium of communication signals periodically transmitted and received between the first controller 10 and the second controller 20, and transmits the communication signals by, for example, P2P communication such as a serial peripheral interface (SPI) or bus communication such as a controller area network (CAN).

The first motor 33 and the second motor 43 are rotationally driven according to alternating currents respectively input from the first inverter 31 and the second inverter 41, and respectively generate a rotational torque for supplying a driving force for assisting or controlling the steering of the vehicle. The first motor 33 and the second motor 43 may each include a rotor, a stator, and a winding, or may share a rotor and a stator and not share a winding, that is, a single motor is physically controlled by a separate winding.

In the first system, the first torque sensor 35 and the first motor rotation angle sensor 37 respectively output sensor signals related to a state of the first motor 33 to the first controller 10. Specifically, the first torque sensor 35 detects a rotational torque of the first motor 33, and outputs a first torque that is a sensor signal according to the detection result. The first motor rotation angle sensor 37 detects a rotor rotation angle of the first motor 33, and outputs a first motor rotation angle that is a sensor signal according to the detection result. The first torque output from the first torque sensor 35 is also input to the second controller 20 for a fail-safe processing, which will be described later.

The first controller 10 is an electronic control device (ECU) that performs various kinds of processing and calculation for realizing the control of the first system in the electric power steering system 1000. The first controller 10 includes a first communication unit 11, a first control command generation unit 12, a first communication abnormality determination unit 13, a first reset determination unit 14, and a first control unit 15 as its function.

The first communication unit 11 transmits and receives a communication signal to and from the second controller 20 via the network 30. The communication signal includes information for the first controller 10 and the second controller 20 to respectively control the first motor 33 and the second motor 43 in cooperation with each other. For example, the communication signal including information such as a control amount of the first motor 33 calculated by the first control command generation unit 12 is transmitted from the first controller 10 to the second controller 20 by the first communication unit 11. In addition, the communication signal including information such as a control amount of the second motor 43 transmitted from the second controller 20 is received by the first communication unit 11.

The first control command generation unit 12 calculates the control amount of the first motor 33 that is a control object based on the first torque and the first motor rotation angle respectively input from the first torque sensor 35 and the first motor rotation angle sensor 37, generates a first control command according to the control amount, and outputs the first control command to the first inverter 31. The first control command generation unit 12 uses, for example, a steering angle signal output from a steering angle sensor (not shown) that is attached to a steering wheel of the vehicle, the first torque, and the first motor rotation angle to obtain a target torque according to the control amount of the first motor 33 by a well-known calculation processing. At this time, by determining a target torque of the first motor 33 in consideration of the control amount of the second motor 43 transmitted from the second controller 20 by the communication signal, that is, a target torque of the second motor 43, a cooperative control is realized between the first controller 10 and the second controller 20. Then, a pulse width modulation (PWM) signal according to the obtained target torque is generated, and output to the first inverter 31 as the first control command. The calculation result of the target torque of the first motor 33 by the first control command generation unit 12 is transmitted from the first communication unit 11 to the second controller 20 via the network 30 by the communication signal.

The first communication abnormality determination unit performs communication abnormality determination to determine whether communication with the second controller 20 by the first communication unit 11 is abnormal. A specific procedure of the communication abnormality determination by the first communication abnormality determination unit 13 will be described later with reference to FIG. 4.

When the first communication abnormality determination unit 13 determines that the communication with the second controller 20 is abnormal, the first reset determination unit 14 performs reset determination to determine whether the communication abnormality is due to a reset of the second controller 20. A specific procedure of the reset determination by the first reset determination unit 14 will be described later with reference to FIGS. 5 and 6.

The first control unit 15 performs control state determination to determine a control mode of the first controller 10 based on the determination results of the first communication abnormality determination unit 13 and the first reset determination unit 14. A specific procedure of the control state determination by the first control unit 15 will be described later with reference to FIG. 7.

The first controller 10 uses each function of the first communication abnormality determination unit 13, the first reset determination unit 14, and the first control unit 15 described above to distinguish and detect each cause of the abnormality of the communication performed between the first controller 10 and the second controller 20, and to perform the fail-safe processing for shifting to the control mode according to the detection results. A specific procedure of the fail-safe processing will be described later with reference to FIG. 3.

The first inverter 31 performs drive control of the first motor 33 based on the first control command output from the first controller 10. For example, switching states of a plurality of switching elements (not shown) are controlled respectively based on the pulse width modulation signal output from the first controller 10 as the first control command. Accordingly, an alternating current having a predetermined amplitude, period, and phase is generated and output to the first motor 33.

In the electric power steering system 1000, the first system can drive the first motor 33 by operations of each component as described above.

The second motor 43 is driven by each component in the second system performing the similar operation as each component of the first system respectively. That is, the second torque sensor 45 and the second motor rotation angle sensor 47 respectively detect a rotational torque and a rotor rotation angle of the second motor 43, and respectively output a second torque and a second motor rotation angle, which are sensor signals according to the detection results, to the second controller 20. The second torque output from the second torque sensor 45 is also input to the first controller 10 for the fail-safe processing. The second controller 20, which is an electronic control device (ECU), includes a second communication unit 21, a second control command generation unit 22, a second communication abnormality determination unit 23, a second reset determination unit 24, and a second control unit 25 as its function. These units correspond to the first communication unit 11, the first control command generation unit 12, the first communication abnormality determination unit 13, the first reset determination unit 14, and the first control unit 15 of the first controller 10, respectively, and perform the same operation. The second inverter 41 performs drive control of the second motor 43 based on the second control command output from the second controller 20. Accordingly, the second motor 43 is driven in the second system.

FIG. 2 is a diagram showing a hardware configuration of the electronic control device according to the first embodiment of the invention. FIG. 2A shows a hardware configuration of the first controller 10. As shown in FIG. 2A, the first controller 10 includes a CPU 101, a ROM 103, a RAM 105, a communication circuit 107, and a PWM generation circuit 109. The CPU 101 executes a program stored in the ROM 103 using the RAM 105 as a work area, so as to perform processing for realizing each function of the first communication unit 11, the first control command generation unit 12, the first communication abnormality determination unit 13, the first reset determination unit 14, and the first control unit 15. The communication circuit 107 operates according to the control of the CPU 101, and performs a processing of transmitting the communication signal to the second controller 20, and a processing of receiving the communication signal transmitted from the second controller 20. The communication circuit 107, together with the CPU 101, realizes the first communication unit 11. The PWM generation circuit 109 operates according to the control of the CPU 101, and performs a processing of generating the pulse width modulation (PWM) signal to be output to the first inverter 31 as the first control command. The PWM generation circuit 109, together with the CPU 101, realizes the first control command generation unit 12.

FIG. 2B shows a hardware configuration of the second controller 20. As shown in FIG. 2B, the second controller 20 includes a CPU 201, a ROM 203, a RAM 205, a communication circuit 207, and a PWM generation circuit 209. Since operations of these units are similar to those of the CPU 101, the ROM 103, the RAM 105, the communication circuit 107, and the PWM generation circuit 109 of the first controller 10, respectively, and the description will be omitted.

Next, a fail-safe processing performed by the first controller 10 will be described. FIG. 3 is a flowchart of the fail-safe processing performed by the first controller 10 according to the first embodiment of the invention. When a power supply of the control system 1 is turned on, the first controller 10 repeatedly performs the fail-safe processing shown in FIG. 3 for each predetermined processing cycle.

Instep S10, the first controller 10 acquires the second torque output from the second torque sensor 45. If the first controller 10 can acquire a latest value of the second torque in another processing, the processing of step S10 by using the value may be omitted. In addition, when the first motor 33 and the second motor 43 share a rotor and a stator as described above, the first torque output from the first torque sensor 35 maybe acquired instead of acquiring the second torque. In this case, the processing of step S10 may be omitted by using the first torque acquired when the first control command generation unit 12 calculates the target torque of the first motor 33.

In step S11, the first controller 10 performs communication abnormality determination by the first communication abnormality determination unit 13. At this time, the first communication abnormality determination unit 13 performs a processing shown in a flowchart of FIG. 4 to determine whether the communication between the first controller 10 and the second controller 20 is normal or abnormal. The details of the flowchart of FIG. 4 will be described later.

In step S12, the first controller 10 determines whether the determination result obtained by the communication abnormality determination performed in step S11 is communication normality. When the determination result is communication normality, that is, when the determination result that the communication between the first controller 10 and the second controller 20 is normal is obtained, the fail-safe processing shown in FIG. 3 ends. Meanwhile, when the determination result is communication abnormality, that is, when the determination result that the communication between the first controller 10 and the second controller 20 is abnormal is obtained, the processing proceeds to step S14.

In step S14, the first controller 10 performs reset determination by the first reset determination unit 14. At this time, the first reset determination unit 14 performs the processing shown in a flowchart of FIG. 5 to determine whether the communication abnormality between the first controller 10 and the second controller 20 is due to the reset of the second controller 20. The details of the flowchart of FIG. 5 will be described later.

In step S15, the first controller 10 performs control state determination by the first control unit 15. At this time, the first control unit 15 performs the processing shown in a flowchart of FIG. 7 to determine the control mode of the first controller 10. The details of the flowchart of FIG. 7 will be described later. When the control mode of the first controller 10 is determined in step S15, the first controller 10 ends the fail-safe processing shown in FIG. 3.

Next, the communication abnormality determination performed in step S11 of FIG. 3 will be described. FIG. 4 is the flowchart of the communication abnormality determination by the first communication abnormality determination unit 13 according to the first embodiment of invention.

In step S111, the first communication abnormality determination unit 13 determines whether there is a possibility of communication abnormality with the controller 20. For example, when data in the communication signal received from the controller 20 via the network 30 is abnormal, it is determined that there is a possibility of the communication abnormality, and the processing proceeds to step S113. The presence or absence of abnormality of the data in the communication signal can be determined by obtaining a difference value between the data of the previously received communication signal and the data of currently received communication signal and determining whether the difference value shows an abnormal value. For example, when the difference value is 0 or out of the range of values that can be obtained by normal control, it is determined that the data is abnormal, and when it is not so, it is determined that the data is normal. In addition, when there is an error in a communication protocol or when the communication signal cannot be received from the controller 20, it is also determined that there is a possibility of communication abnormality, and the processing proceeds to step 113. Meanwhile, when these conditions are not satisfied, it is determined that there is no possibility of communication abnormality, and the processing proceeds to step S114.

In step S113, the first communication abnormality determination unit 13 increments a communication abnormality determination counter. The communication abnormality determination counter is a counter for measuring a period in which it is determined that there is a possibility of the communication abnormality, and is stored in the RAM 105 during the operation of the first controller 10.

After performing the processing of step S113, in step S115, the first communication abnormality determination unit determines whether the communication abnormality determination counter is larger than a predetermined communication abnormality determination threshold value. As a result, when the communication abnormality determination counter is larger than the communication abnormality determination threshold value, the processing proceeds to step S117, and when it is not so, that is when the communication abnormality determination counter is equal to or less than the communication abnormality determination threshold value, the processing proceeds to step S118. The communication abnormality determination threshold value used in the determination in step S115 is preset to a value according to a time sufficient to determine that the communication with the controller 20 is abnormal, in consideration of a performing cycle of the fail-safe processing. For example, the communication abnormality determination threshold value can be set based on a maximum value of a communication cycle in the normal operation or a maximum value of a communication interval allowed on the system.

When it is determined in step S115 that the communication abnormality determination counter is larger than the communication abnormality determination threshold value, in step S117, the first communication abnormality determination unit 13 determines that there is communication abnormality, that is, the communication between the first controller 10 and the second controller 20 is abnormal. When step S117 is performed and the determination result of the communication abnormality is obtained, the first communication abnormality determination unit 13 ends the communication abnormality determination shown in FIG. 4.

Meanwhile, when it is determined in step S115 that the communication abnormality determination counter is equal to or less than the communication abnormality determination threshold value, in step S118, the first communication abnormality determination unit 13 determines that there is no communication abnormality, that is, the communication between the first controller 10 and the second controller 20 is normal. When step S118 is performed and the determination result of the communication abnormality is obtained, the first communication abnormality determination unit 13 ends the communication abnormality determination shown in FIG. 4.

When it is determined in step S111 that there is no possibility of communication abnormality, the first communication abnormality determination unit 13 clears the above communication abnormality determination counter to an initial value (for example, 0) in step S114. Then, the processing described above is performed in step S118, and after that the communication abnormality determination shown in FIG. 4 ends.

The first communication abnormality determination unit 13 performs the communication abnormality determination as described above to determine whether the communication between the first controller 10 and the second controller 20 is normal or abnormal.

Next, the reset determination performed in step S14 of FIG. 3 will be described. FIG. 5 is the flowchart of the reset determination by the first reset determination unit 14 according to the first embodiment of the invention.

In step S141, the first reset determination unit 14 determines whether the second torque acquired in step S10 satisfies a predetermined reset condition. As a result, when it is determined that the reset condition is satisfied, the processing proceeds to step S143, and when it is determined that the reset condition is not satisfied, the processing proceeds to step S145. As described above, when the processing in step S10 is omitted because the second torque can be acquired by another processing, the determination in step S141 is performed using the second torque. In addition, when the first torque is acquired instead of acquiring the second torque as described above, it may be determined in step S141 whether the first torque satisfies the reset condition.

The reset condition used in the determination in step S141 is preset according to a change in a value of the second torque to be output from the second torque sensor 45 when the second controller 20 is reset to stop a control of the second motor 43 in the first controller 10. Hereinafter, a reset determination method in step S141 according to the first embodiment of the invention will be described with reference to FIG. 6 taking a case of using a reset determination area D1 shown in FIG. 6 as the reset condition as a specific example. In FIG. 6, a waveform 61 represents an input torque of the steering by the driver of the vehicle, and a waveform 62 represents an output torque at a normal time output by the second motor 43 with respect to the input torque. In the reset determination area D1, for example, an area around 50% of the output torque at the normal time is set.

FIG. 6A is a diagram illustrating a state of a change in the second torque when the second controller 20 is not reset when the first communication abnormality determination unit 13 detects the communication abnormality. In this case, since the communication between the first controller 10 and the second controller 20 becomes abnormal, the cooperative control is not possible, but the control of the second motor 43 by the second controller 20 is continuously performed. Therefore, as shown by the broken line, although the second torque fluctuates around the output torque at the normal time shown by the waveform 62, the second torque does not largely decrease from the output torque. Therefore, the second torque does not reach the reset determination area D1, and it is determined in step S141 that the reset condition is not satisfied.

FIG. 6B is a diagram illustrating a state of a change in the second torque when the second controller 20 is reset when the first communication abnormality determination unit 13 detects the communication abnormality. In this case, since the control of the second motor 43 by the second controller 20 is stopped, the second system is stopped in the electric power steering system 1000, and the second torque is rapidly decreased. However, since the first motor 33 of the first system, which is a redundant system, is driven, the second torque does not completely become 0, and a value about half the output torque at the normal time is detected as the second torque. As a result, as shown by the broken line, the second torque changes to be in the reset determination area D1, and it is determined in step S141 that the reset condition is satisfied.

In the reset determination area D1 described above, an area other than around 50% of the output torque at the normal time may be set. For example, when the first motor 33 and the second motor 43 are completely separated mechanically and the driving of the first motor 33 does not affect the second motor 43, once the second controller 20 is reset and the second motor 43 is stopped, the second torque becomes 0. Therefore, in such a case, the area around 0% of the output torque at the normal time may be set in the reset determination area D1. Besides this, the reset determination area D1 can be set in consideration of the change of the second torque when the cooperative control is not performed due to the communication abnormality, and the change of the second torque when the second motor 43 is stopped while the first motor 33 is driven.

In the determination in step S141, a reset condition other than the reset determination area D1 shown in FIG. 6 may be used as the reset condition. For example, focusing on the decrease speed of the second torque when the second motor 43 stops, and using a reset condition that a change amount (decrease amount) of the second torque per predetermined unit time exceeds a predetermined threshold value, the determination in step S141 can be performed depending on whether the reset condition is satisfied. Alternatively, focusing on the fact that the second torque decreases continuously when the second motor 43 stops, and using a reset condition that the second torque monotonically decreases within a predetermined determination time, the determination in step S141 can also be performed depending on whether the reset condition is satisfied. Besides this, in consideration of the change of the second torque when the cooperative control is not performed due to the communication abnormality, and the change of the second torque when the second motor 43 is stopped while the first motor 33 is driven, the reset determination condition can be set.

Returning to the description of FIG. 5, in step S143, the first reset determination unit 14 determines that the second controller 20 is reset. Accordingly, a determination result is obtained that the cause of the communication abnormality between the first controller 10 and the second controller 20 detected by the first communication abnormality determination unit 13 in the communication abnormality determination in step S11 is the reset of the second controller 20. After performing step S143, the first reset determination unit 14 ends the reset determination shown in FIG. 5.

Meanwhile, when it is determined in step S141 that the second torque does not satisfy the reset condition, the first reset determination unit 14 increments a reset determination counter in step S145. The reset determination counter is a counter for measuring a period in which it is determined that the second torque does not satisfy the reset condition, and is stored in the RAM 105 during the operation of the first controller 10. That is, even when the second controller 20 is reset and the control of the second motor 43 is stopped, as shown in FIG. 6B, since it takes some time for the second torque to reach the reset determination area D1, the second torque does not necessarily satisfy the reset condition at the time of step S141. Therefore, when the second torque does not satisfy the reset condition, the time is measured by the reset determination counter.

After performing the processing in step S145, in step S147, the first reset determination unit 14 determines whether the reset determination counter is larger than a predetermined reset determination threshold value. As a result, when the reset determination counter is larger than the reset determination threshold value, the processing proceeds to step S149, and when it is not so, that is when the reset determination counter is equal to or less than the reset determination threshold value, the reset determination shown in FIG. 5 ends. The reset determination threshold value used in the determination in step S147 is preset to a value according to a time sufficient to determine that the controller 20 is not reset, in consideration of the time until the reset of the second controller 20 affects the second torque and the reset condition is satisfied.

When it is determined in step S147 that the reset determination counter is larger than the reset determination threshold value, in step S149, the first reset determination unit 14 determines that the network 30 is abnormal or at least one of the first communication unit 11 of the first controller 10 and the second communication unit 21 of the second controller is abnormal. Accordingly, a determination result is obtained that the cause of the communication abnormality between the first controller 10 and the second controller 20 detected by the first communication abnormality determination unit 13 in the communication abnormality determination in step S11 is not the reset of the second controller 20 but the abnormality of the communication system. After performing step S149, the first reset determination unit 14 ends the reset determination shown in FIG. 5.

When the communication between the first controller 10 and the second controller 20 is abnormal, the first reset determination unit 14 can determine whether the second controller 20 is reset based on a change in the second torque, which is a sensor signal related to the state of the second motor 43, by performing the reset determination as described above.

Next, the control state determination performed in step S15 of FIG. 3 will be described. FIG. 7 is the flowchart of the control state determination by the first control unit 15 according to the first embodiment of the invention.

In step S151, the first control unit 15 determines whether the second controller 20 is reset based on the result of the reset determination in step S14. When the determination result that the second controller 20 is reset can be obtained by performing step S143 in the reset determination, the processing proceeds to step S153. Meanwhile, when the determination result that the second controller 20 is not reset is obtained by performing step S149 in the reset determination, the processing proceeds to step S157. When neither step S143 nor step S149 is performed in the reset determination, that is, when it is determined in step S147 that the reset determination counter is equal to or less than the reset determination threshold value, it is preferable to end the control state determination shown in FIG. 7 without performing the processing in step S151.

In step S153, the first control unit 15 determines a control state of the first controller 10 so as to continue the operation of the first controller 10 and continue the control of the first motor 33. Accordingly, when the second system is stopped in the electric power steering system 1000, the operation of the first system is continued to prevent the entire system from being stopped. After performing step S153, the first control unit 15 ends the control state determination shown in FIG. 7.

Meanwhile, when it is determined in step S151 that the second controller 20 is not reset, in step S155, the first control unit 15 compares the priority of the first controller 10 with the priority of the second controller 20 to determine whether the priority of the first controller 10 is higher. As a result, when it is determined that the priority of the first controller 10 is higher, the processing proceeds to step S153, and when it is not so, that is when it is determined that the priority of the second controller 20 is higher, the processing proceeds to step S157. In the first controller 10 and the second controller 20, the priorities according to the priority of continuation of the control are preset respectively, and both priorities are stored respectively.

When it is determined in step S155 that the priority of the first controller 10 is higher, similarly to a case where it is determined in step S151 that the second controller 20 is reset, the first control unit 15 continues the operation of the first controller 10 and continues the control of the first motor 33 by performing step S153. Meanwhile, when it is determined in step S155 that the priority of the second controller 20 is higher, in step S157, the first control unit 15 determines the control state of the first controller 10 so as to stop the operation of the first controller 10 and not perform the control of the first motor 33. As a result, the output of the first control command from the first control command generation unit 12 is stopped in the first controller 10, and the drive control of the first motor 33 by the first inverter 31 is not performed. Accordingly, when the second system is operating in the electric power steering system 1000, and the priority of the second system is high, the operation of the first system is stopped. After performing step S157, the first control unit 15 ends the control state determination shown in FIG. 7.

When the second controller 20 is reset by performing the control state determination as described above, the first control unit 15 can continue the operation of the first controller 10. In addition, when the second controller 20 is not reset, it is possible to determine whether to stop the first controller 10 according to the priorities of the first controller 10 and the second controller 20. That is, since the first controller 10 and the second controller 20 respectively perform the same fail-safe processing, when the cause of the communication abnormality between them is other than a reset of one controller, the communication abnormality maybe detected at the same timing. Therefore, when the first controller 10 and the second controller 20 respectively stop the operations thereof without considering the priority, the entire control system 1 is stopped. However, as described above, by determining whether the first controller 10 and the second controller 20 stop the operations thereof in consideration of the respective priorities thereof, only one of the first controller 10 and the second controller 20 is stopped in the control system 1. That is, in the control system 1, when the first reset determination unit 14 determines that the second controller 20 is not reset and the second controller 20 determines that the first controller 10 is not reset, either the control of the first motor 33 by the first controller 10 or the control of the second motor 43 by the second controller 20 is stopped based on the priorities preset with respect to the first controller 10 and the second controller 20 respectively. As a result, in the electric power steering system 1000, the entire system can be avoided from being stopped.

According to the first controller 10 described above, when the communication abnormality occurs between the first controller 10 and the second controller 20, the cause of the communication abnormality can be immediately distinguished and determined. That is, it can be determined without waiting for the second controller 20 to recover from a reset state whether the communication abnormality with respect to the second controller 20 is caused by the abnormality of the communication system such as the network 30 or the communication function of each other, or is caused by the rest of the second controller 20 that is the communication partner. When a time until the second controller 20 recovers from the reset state has elapsed, it is also possible to determine the cause of the communication abnormality without performing the fail-safe processing described in the present embodiment by confirming whether a communication state after recovery is normal in the first controller 10. However, in such a method, it is necessary for the first controller 10 to wait until at least the second controller 20 recovers from the reset state in order to determine the cause of the communication abnormality. In contrast, according to the fail-safe processing described in the present embodiment, it is possible to determine the cause of the communication abnormality in the first controller 10 without waiting until the second controller 20 recovers from the reset state. Therefore, it is possible to make a determination earlier than in the related art.

In the fail-safe processing described in the present embodiment, in response to the result of the reset determination by the first reset determination unit 14, the first controller 10 can immediately determine the control mode thereof. Similarly, the second controller 20 can immediately determine the control mode thereof. Therefore, it is possible to avoid a situation in which the entire system of the electric power steering system 1000, that is, the first system and the second system are both stopped at the same time, and the control of the first system and the control of the second system are respectively performed asynchronously.

According to the first embodiment of the invention described above, the following effects can be obtained.

(1) The first controller 10, which is an electronic control device, includes: the first control command generation unit 12 that generates and outputs the first control command for controlling the first motor 33 which is a first control object; the first communication unit 11 that performs communication with the second controller 20 that is another electronic control device that controls the second motor 43 that is a second control object; the first communication abnormality determination unit 13 that determines whether the communication with the second controller 20 by the first communication unit 11 is abnormal; and the first reset determination unit 14 that determines whether the second controller 20 is reset based on the change in the second torque that is a sensor signal related to the state of the second motor 43 when the first communication abnormality determination unit 13 determines that the communication with the second controller is abnormal. Consequently, when the communication abnormality occurs between the first controller 10 and the second controller 20, the cause can be immediately determined.

(2) The first reset determination unit 14 determines that the second controller 20 is reset when the second torque changes to be within the predetermined reset determination area D1 in steps S141 and S143. It can also be determined that the second controller 20 is reset when the change amount of the second torque per predetermined unit time exceeds the predetermined threshold value. It can be further determined that the second controller 20 is reset when the second torque monotonically decreases within the predetermined determination time. Consequently, it can be appropriately determined whether the second controller 20 is reset in consideration of the change of the second torque when the cooperative control is not performed due to the communication abnormality, and the change of the second torque when the second motor 43 is stopped while the first motor 33 is driven.

(3) When the first reset determination unit 14 determines that the second controller 20 is reset in steps S151 and S153, the first control command generation unit 12 continues the output of the first control command. Consequently, when the second controller 20 is reset, the control of the first motor 33 by the first controller 10 can be continued to prevent the electric power steering system 1000 from being stopped.

Second Embodiment

Next, a second embodiment of the invention will be described. In the present embodiment, an example of limiting the control amount of the motor that is the control object when the communication abnormality is detected will be described.

FIG. 8 is a block diagram showing a configuration of an electric power steering system on which an electronic control device according to the second embodiment of the invention is mounted. When comparing an electric power steering system 1001 shown in FIG. 8 with the electric power steering system 1000 described in the first embodiment, they are different in that the first controller 10 and the second controller 20 in the control system 1 of FIG. 1 are replaced with a first controller 10A and a second controller 20A in a control system 1A. The first controller 10A functionally includes a first control command generation unit 12A and a first reset determination unit 14A instead of the first control command generation unit 12 and the first reset determination unit 14 in FIG. 1. Similarly, the second controller 20A functionally includes a second control command generation unit 22A and a second reset determination unit 24A instead of the second control command generation unit 22 and the second reset determination unit 24 in FIG. 1. Since other points are the same as those of the first embodiment, the description thereof will be omitted below.

The first controller 10A and the second controller 20A respectively perform a fail-safe processing by a procedure different from that described in the first embodiment. In the fail-safe processing, when it is determined that the communication between the first controller 10A and the second controller 20A is abnormal, the first control command generation unit 12A and the second control command genera- tion unit 22A limit control amounts of the first motor 33 and the second motor 43 respectively, which are control objects. The first reset determination unit 14A and the second reset determination unit 24A perform reset determination in a procedure different from that described in the first embodiment. Since the operations of the first controller 10A and the second controller 20A are similar, only the operation of the first controller 10A will be described below, and the description of the operation of the second controller 20A will be omitted.

FIG. 9 is a flowchart of a fail-safe processing performed by the first controller 10A according to the second embodiment of the invention. When a power supply of the control system 1A is turned on, the first controller 10A repeatedly performs the fail-safe processing shown in FIG. 9 for each predetermined processing cycle. In the flowchart of FIG. 9, steps S10 to S12 and S15 are similar to those in FIG. 3, respectively. Steps S13 and S14A different from those in FIG. 3 will be described below.

When it is determined in step S12 that the result of the communication abnormality determination in step S11 is communication abnormality, the first controller 10A limits a control amount of the first motor 33 in step S13. Here, the control amount of the first motor 33 is limited by limiting a first control command output from the first control command generation unit 12A to the first inverter 31 to a value lower than a value at the normal time. For example, the first control command generation unit 12 generates and outputs a first control command to the first inverter 31 such that an output torque of the first motor 33 is limited to X % (for example, 25%) thereof with respect to a target torque of the first motor 33 determined based on the steering angle signal, the first torque, and the first motor rotation angle. Besides this, for example, the control amount of the first motor 33 maybe limited by another method, such as outputting a predetermined control amount as the first control command regardless of the target torque. After performing step S13 by the first controller 10A, the processing proceeds to step S14A.

In step S14A, the first controller 10A performs reset determination by the first reset determination unit 14A. At this time, the first reset determination unit 14A performs a processing shown in a flowchart of FIG. 10, and determines whether the communication abnormality between the first controller 10A and the second controller 20A is due to a reset of the second controller 20A.

FIG. 10 is a flowchart of the reset determination by the first reset determination unit 14A according to the second embodiment of the invention. In step S141A, the first reset determination unit 14A determines which time the second torque acquired in step S10 matches, a normal time or a reset time. As a result, when it is determined that the second torque matches the reset time, the processing proceeds to step S143, and when it is determined that the second torque matches the normal time, the processing proceeds to step S149. Also in the present embodiment, similarly as described in the first embodiment, when the processing of step S10 is omitted because the second torque can be acquired by another processing, the determination of step S141A is performed using the second torque. In addition, when the first torque is acquired instead of acquiring the second torque as described above, it may be determined in step S141A which time the first torque matches, the normal time or the reset time.

In consideration of the control amount of the first motor 33 limited in step S13 of FIG. 9 and the control amount of the second motor 43 similarly limited, the determination in step S141A is performed by determining whether the second torque matches the limited control amount of the motor. Hereinafter, a reset determination method in step S141A according to the second embodiment of the invention will be described with reference to FIG. 11 using a case where the output torque of the first motor 33 is limited to X % of the target torque described above as an example. In FIG. 11, similarly to FIG. 6 described in the first embodiment, the waveform 61 represents an input torque of the steering by the driver of the vehicle, and the waveform 62 represents an output torque at the normal time output by the second motor 43 with respect to the input torque.

FIG. 11A is a diagram illustrating a state of the change in the second torque when the second controller 20A is not reset when the first communication abnormality determination unit 13 detects the communication abnormality. In this case, since the output torque of the first motor 33 is limited to X % of the target torque in the first controller 10A, and the control of the second motor 43 by the second controller 20A is continuously performed, similarly, the output torque of the second motor 43 is limited to X % of the target torque in the second controller 20A. Therefore, as shown by the broken line, a value of 2X % of the target torque is detected as the second torque. Here, when a value around 2X % of the target torque is set in a normal determination area D2, since the second torque falls within the normal determination area D2, it is determined that the second torque matches the normal time in step S141A.

FIG. 11B is a diagram illustrating a state of the change in the second torque when the second controller 20A is reset when the first communication abnormality determination unit 13 detects the communication abnormality. In this case, since the control of the second motor 43 by the second controller 20A is stopped, the second system is stopped in the electric power steering system 1001, and the second torque is rapidly decreased. Meanwhile, the first motor 33 of the first system, which is the redundant system, is driven, and the output torque thereof is limited to the X % of the target torque. Therefore, the second torque is not completely 0 as shown by the broken line, and the value of X % of the output torque at the normal time is detected as the second torque. Here, when a value around X % of the target torque is set in a reset determination area D3, since the second torque falls within the reset determination area D3, it is determined that the second torque matches the reset time torque in step S141A.

Similarly to the reset determination area D1 according to the first embodiment, the normal determination area D2 and the reset determination area D3 described above may be set to areas other than those illustrated in FIG. 11. In consideration of the change of the second torque due to the control amount of the first motor 33 and the second motor 43 being limited in the first controller 10A and the second controller 20A, and the change of the second torque when the second motor 43 is stopped while the first motor 33 is driven, the normal determination area D2 and the reset determination area D3 can be set.

Returning to the description of FIG. 10, in step S143, the first reset determination unit 14A determines that the second controller 20 is reset. Accordingly, a determination result is obtained that the cause of the communication abnormality between the first controller 10A and the second controller 20A detected by the first communication abnormality determination unit 13 in the communication abnormality determination in step S11 is the reset of the second controller 20A. After performing step S143, the first reset determination unit 14A ends the reset determination shown in FIG. 10.

Meanwhile, when it is determined in step S141A that the second torque matches the normal time, in step S149, the first reset determination unit 14A determines that the network 30 is abnormal or that at least one of the first communication unit 11 of the first controller 10A and the second communication unit 21 of the second controller 20A is abnormal. Accordingly, a determination result is obtained that the cause of the communication abnormality between the first controller 10A and the second controller 20A detected by the first communication abnormality determination unit 13 in the communication abnormality determination in step S11 is not the reset of the second controller 20A but the abnormality of the communication system. After performing step S149, the first reset determination unit 14A ends the reset determination shown in FIG. 10.

According to the second embodiment of the invention described above, when the first communication abnormality determination unit 13 determines that the communication with the second controller 20A is abnormal, the first control command generation unit 12A limits the control amount of the first motor 33 in the first control command in step S13. In steps S141A and S149, the first reset determination unit 14A determines that the second controller 20A is not reset when the change amount of the second torque matches the limited control amount. Consequently, it is possible to prevent unintended control from being performed by the driver of the vehicle at the time of communication abnormality and to make a determination earlier when the second controller 20A is not reset.

Third Embodiment

Next, a third embodiment of the invention will be described. In the first embodiment described above, an example has been described in which the priorities are preset with respect to the first controller 10 and the second controller 20 respectively, and when the first controller 10 or the second controller 20 is reset based on the priorities, either the control of the first motor 33 by the first controller 10 or the control of the second motor 43 by the second controller 20 is stopped. In contrast, in the present embodiment, an example of only stopping the first controller 10 without setting the priority will be described.

FIG. 12 is a block diagram showing a configuration of an electric power steering system on which an electronic control device according to the third embodiment of the invention is mounted. When comparing an electric power steering system 1002 shown in FIG. 12 with the electric power steering system 1000 described in the first embodiment, they are different in that the first controller 10 and the second controller 20 in the control system 1 of FIG. 1 are replaced with a first controller 10B and a second controller 20B in a control system 1B, and the first torque is not output from the first torque sensor 35 to the second controller 20B. The first controller 10B functionally includes a first control unit 15B instead of the first control unit 15 in FIG. 1. Meanwhile, the second controller 20B functionally includes only the second communication unit 21 and the second control command generation unit 22, and does not include the second communication abnormality determination unit 23, the second reset determination unit 24, and the second control unit 25 in FIG. 1. That is, the second controller 20B of the present embodiment has the communication function with the first controller 10B and the control function of the second motor 43, but does not have the fail-safe function based on the first torque. Since other points are the same as those of the first embodiment, the description thereof will be omitted below.

The first controller 10B performs a fail-safe processing by a procedure different from that described in the first embodiment. In the fail-safe processing, the first control unit 15B performs determination of a control state determination in a procedure different from that described in the first embodiment.

FIG. 13 is a flowchart of the fail-safe processing performed by the first controller 10B according to the third embodiment of the invention. When a power supply of the control system 1B is turned on, the first controller 10B repeatedly performs the fail-safe processing shown in FIG. 13 for each predetermined processing cycle. In the flowchart of FIG. 13, steps S10 to S14 are similar to those in FIG. 3, respectively. Hereinafter, step S15B different from that in FIG. 3 will be described.

When the reset determination is performed by the first reset determination unit 14 in step S14, the first controller 10B performs the control state determination by the first control unit 15B in step S15B. At this time, the first control unit 15B performs a processing shown in the flowchart of FIG. 14 to determine a control mode of the first controller 10B.

FIG. 14 is a flowchart of the control state determination by the first control unit 15B according to the third embodiment of the invention. In step S151, the first control unit 15B determines whether the second controller 20B is reset based on the result of the reset determination in step S14. When the determination result that the second controller 20B is reset is obtained by performing step S143 in the reset determination, similar to that in the first embodiment, instep S153, the control state of the first controller 10B is determined to continue the operation of the first controller 10B and to continue the control of the first motor 33. Then, the first control unit 15B ends the control state determination shown in FIG. 14.

Meanwhile, when the determination result that the second controller 20B is not reset is obtained by performing step S149 in the reset determination, the processing proceeds to step S157. That is, in this case, different from the first embodiment, in step S157, the control state of the first controller 10B is determined to stop the operation of the first controller 10B and not to perform the control of the first motor 33 without performing the determination in step S155 of FIG. 7. Then, the first control unit 15B ends the control state determination shown in FIG. 14.

When the second controller 20B is reset by performing the control state determination as described above, similar to that in the first embodiment, the first control unit 15B can continue the operation of the first controller 10B. Meanwhile, when the second controller 20B is not reset, different from the first embodiment, the first controller 10B is stopped and the output of the first control command from the first control command generation unit 12 can be stopped. That is, in the present embodiment, since the second controller 20B does not perform the fail-safe processing, the operation of the second controller 20B is not stopped by resetting the first controller 10B even when a communication abnormality occurs between the controllers. Therefore, in such a case, by stopping the operation of the first controller 10B, it is possible to prevent unintended control from being performed by the driver of the vehicle at the time of communication abnormality in the electric power steering system 1002 while avoiding the entire system from being stopped.

According to the third embodiment of the invention described above, in steps S151 and S157, when the first reset determination unit 14 determines that the second controller 20B is not reset, the first control command generation unit 12 stops the output of the first control command. Meanwhile, in steps S151 and S153, when the first reset determination unit 14 determines that the second controller 20B is reset, the output of the first control command is continued. Consequently, when the communication abnormality between the first controller 10B and the second controller 20B is detected, it is possible to appropriately determine whether to continue the control of the first motor 33 by the first controller 10B according to the cause of the communication abnormality.

Modifications

In each of the embodiments described above, the number of controllers connected to the network 30 to communicate with each other is not limited to two, and may be three or more. In this case, for example, when the number of controllers is N, it is preferable to set an area around 1/N of the output torque of the motor at the normal time in the reset determination area D1 in the first embodiment according to the number of controllers. The limited output torque of the motor in the second embodiment is also preferably set according to the number of controllers.

In the first and second embodiments described above, an example is described in which the first control unit 15 of the first controllers 10 and 10A and the second control unit 25 of the second controllers 20 and 20A respectively perform the control state determination in FIG. 7, so as to stop one controller according to the respective priorities when the other controller is not reset. However, a control circuit different from the first controllers 10 and 10A and the second controllers 20 and 20A may be provided in the control systems 1 and 1A to determine which controller is to be stopped in the control circuit.

In each of the embodiments described above, an example is described in which the first motor 33 and the second motor 43, which generate the driving force occur for assisting or controlling the steering of the vehicle in the electric power steering system, are taken as the control objects of the controller, but other objects may be taken as the control objects of the controller. For example, if an object is used in a system in which a plurality of systems are redundant, such as a traveling motor and a brake actuator of a vehicle, and various actuators mounted on a system other than the vehicle, various objects can be taken as the control objects. In this case, it is preferable that the reset condition in step S141 described in the first embodiment and the determination condition in step S141A described in the second embodiment are set according to the control object. For example, in a case where the detected sensor signal changes in an increasing direction when one system stops, the determination in step S141 is performed whether reset conditions are satisfied, the reset conditions being that a change amount of the sensor signal, that is, an increase amount exceeds a predetermined threshold value, or the sensor signal monotonically increases within a predetermined determination time. As a result, when these reset conditions are satisfied, it can be determined in one controller that the other controller is reset.

Each embodiment and the modification described above are merely examples, and the invention is not limited to these contents as long as the characteristics of the invention are not impaired. Although various embodiments have been described above, the invention is not limited to these contents. Other embodiments that are considered within the scope of the technical idea of the invention are also included within the scope of the invention.

The disclosure content of the following priority basic application is incorporated herein by reference.

Japanese Patent Application No. 2016-247783 (filed on Dec. 21, 2016)

REFERENCE SIGN LIST 1, 1A, 1B: control system
10, 10A, 10B: first controller
11: first communication unit
12, 12A: first control command generation unit
13: first communication abnormality determination unit
14, 14A: first reset determination unit
15, 15B: first control unit
20, 20A, 20B: second controller
21: second communication unit
22, 22A: second control command generation unit
23: second communication abnormality determination unit
24, 24A: second reset determination unit
25: second control unit
30: network
31: first inverter
33: first motor
35: first torque sensor
37: first motor rotation angle sensor
41: second inverter
43: second motor
45: second torque sensor
47: second motor rotation angle sensor
1000, 1001, 1002: electric power steering system

The invention claimed is:

1. An electronic control device, comprising:
one or more processors and one or more non-transitory computer-readable storage media, the non-transitory computer-readable storage media having stored thereon at least:
a control command generation unit that generates and outputs a control command for controlling a first control motor, and directly receives a second torque signal associated with a second control motor;
a communication unit that performs periodic serial digital communication over a network with another electronic control device that controls a second control motor;
a communication abnormality determination unit that determines whether the periodic serial digital communication with the another electronic control device by the communication unit is abnormal; and
a reset determination unit that determines whether the another electronic control device is reset based on a change in the second torque signal associated with the second control motor when the communication abnormality determination unit determines that the periodic serial digital communication with the another electronic control device is abnormal,
wherein the another electronic control device comprises one or more processors and one or more non-transitory computer-readable storage media, the non-transitory computer-readable storage media having stored thereon at least:
a second control command generation unit that generates and outputs a second control command for controlling the second control motor, and directly receives a first torque signal associated with the first torque motor;
a second communication unit that performs communication with the electronic control device that controls the second control motor; and a second communication abnormality determination unit that determines whether communication with the electronic control device by the second communication unit is abnormal.

2. The electronic control device according to claim 1, wherein
the reset determination unit determines that the another electronic control device is reset when the sensor signal changes to be within a predetermined reset determination area.

3. The electronic control device according to claim 1, wherein
the reset determination unit determines that the another electronic control device is reset when a change amount of the sensor signal per predetermined unit time exceeds a predetermined threshold value.

4. The electronic control device according to claim 1, wherein
the reset determination unit determines that the another electronic control device is reset when the sensor signal monotonically increases or monotonically decreases within a predetermined determination time.

5. The electronic control device according to claim 1, wherein
the control command generation unit stops the output of the control command when the reset determination unit determines that the another electronic control device is not reset.

6. The electronic control device according to claim 1, wherein
the control command generation unit continues the output of the control command when the reset determination unit determines that the another electronic control device is reset.

7. The electronic control device according to claim 1, wherein
the control command generation unit limits a control amount of the first control motor in the control command when the communication abnormality determination unit determines that the communication with the another electronic control device is abnormal.

8. The electronic control device according to claim 7, wherein
the reset determination unit determines that the another electronic control device is not reset when a change amount of the sensor signal matches the limited control amount.

9. A control system, comprising: the electronic control device according to claim 1; and the another electronic control device, wherein
control of the first control motor by the electronic control device or control of the second control motor by the another electronic control device is stopped based on priorities preset with respect to the electronic control device and the another electronic control device when the reset determination unit determines that the another electronic control device is not reset, and the second reset determination unit determines that the electronic control device has not been reset.

10. A reset determination method in a control system which includes a first electronic control device and a second electronic control device that perform communication with each other, the reset determination method comprising:
determining, by the first electronic control device, whether the communication with the second electronic control device is abnormal;

receiving by the first electronic control device a second torque signal associated with a second control motor; and determining, by the first electronic control device, whether the second electronic control device is reset based on a change of the second torque signal associated with the second control motor on a condition that it is determined that the communication with the second electronic control device is abnormal, wherein the first electronic control device comprises one or more processors and one or more non-transitory computer-readable storage media, the non-transitory computer-readable storage media having stored thereon at least:

a first control command generation unit that generates and outputs a first control command for controlling a first control motor, and directly receives a second torque signal associated with a second control motor;

a first communication unit that performs serial digital communication over a network with the second electronic control device;

a first communication abnormality determination unit that determines whether communication with the second electronic control device by the first communication unit is abnormal, and wherein the second electronic control device comprises one or more processors and one or more non-transitory computer-readable storage media, the non-transitory computer-readable storage media having stored thereon at least:

a second control command generation unit that generates and outputs a_second control command for controlling the second control motor, and directly receives a first torque signal associated with the first control motor;

a second communication unit that performs communication with the first electronic control device; and a second communication abnormality determination unit that determines whether communication with the first electronic control device is abnormal.

* * * * *